No. 761,573. PATENTED MAY 31, 1904.
J. P. BARNES.
DRILLING MACHINE ATTACHMENT.
APPLICATION FILED NOV. 25, 1903.
NO MODEL. 2 SHEETS—SHEET 1.
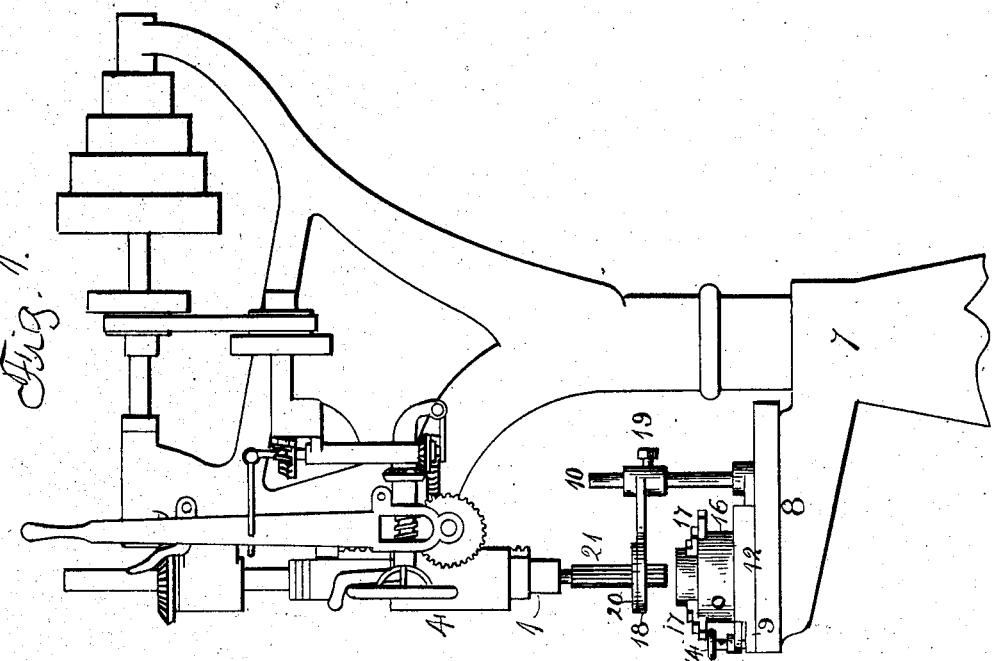
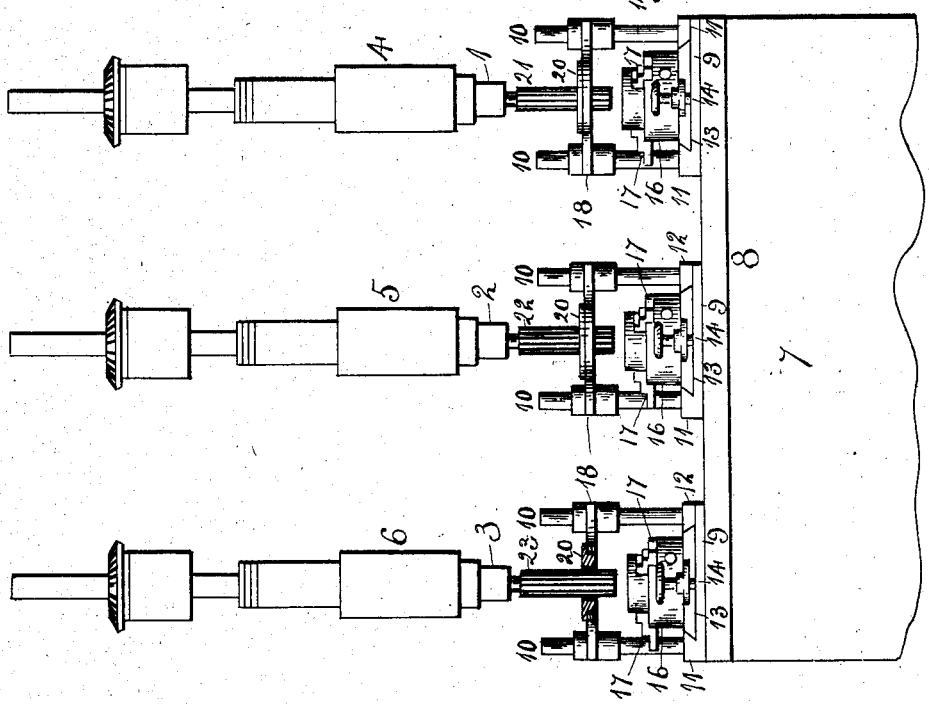
Witnesses:
H. J. Slagle
E. Behel.
Inventor—
Joseph P. Barnes
By A. O. Behel
Attys.

No. 761,573. PATENTED MAY 31, 1904.
J. P. BARNES.
DRILLING MACHINE ATTACHMENT.
APPLICATION FILED NOV. 25, 1903.
NO MODEL. 2 SHEETS—SHEET 2.
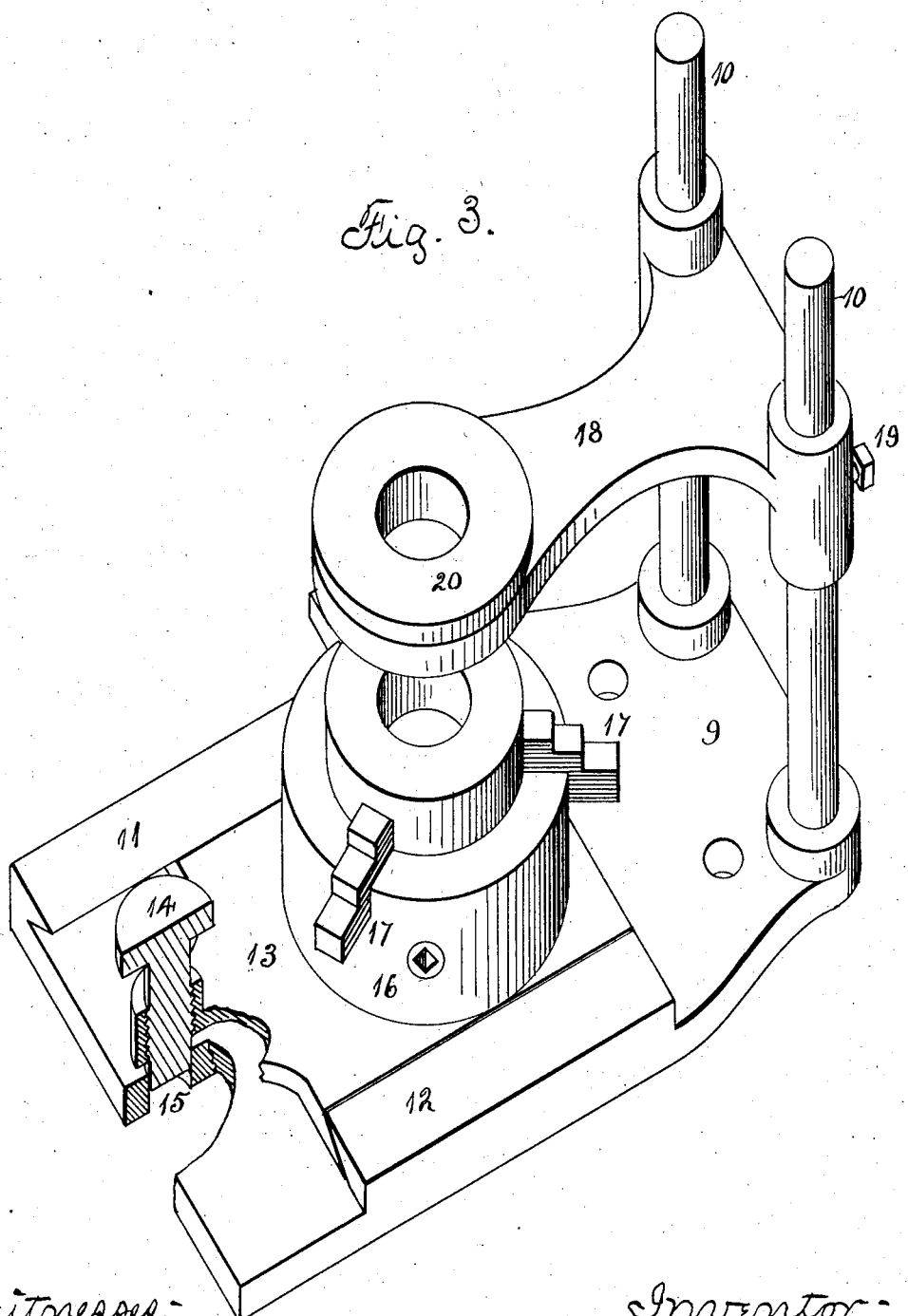

No. 761,573. Patented May 31, 1904.

UNITED STATES PATENT OFFICE.

JOSEPH P. BARNES, OF ROCKFORD, ILLINOIS, ASSIGNOR TO W. F. & JOHN BARNES COMPANY OF ROCKFORD, ILLINOIS, A CORPORATION OF ILLINOIS.

DRILLING-MACHINE ATTACHMENT.

SPECIFICATION forming part of Letters Patent No. 761,573, dated May 31, 1904.

Application filed November 25, 1903. Serial No. 182,603. (No model.)

*To all whom it may concern:*

Be it known that I, JOSEPH P. BARNES, a citizen of the United States, residing at Rockford, in the county of Winnebago and State of Illinois, have invented certain new and useful Improvements in Drilling-Machine Attachments, of which the following is a specification.

The object of this invention is to provide a work-holder and a tool-guide for drilling-machines; and it consists in a universal chuck supported centrally under the drill-spindle and having a set connection with the stationary part of a drill-frame and in a guide for the tool.

In the accompanying drawings, Figure 1 is a side elevation of a drilling-machine and my improvements in connection therewith. Fig. 2 is a face representation of a series of drill-spindles and their supports, together with my improvements. Fig. 3 is an isometrical representation of my improvements.

The drilling-machine shown in the drawings is of a construction shown in Patent No. 516,150, granted to W. F. Barnes March 6, 1894, in which the drill-spindle is automatically fed and automatically stopped, and I have selected this type of drill to which to apply my improvements. The three drill-spindles 1, 2, and 3 are mounted in heads 4, 5, and 6, supported by the base 7. A table 8 is located beneath the three drill-spindles.

My improvements are shown at Fig. 3 of the drawings, and their connection and location with respect to the drill-spindle will be described later on.

The base-plate 9 has two guideways 11 and 12 extending from its upper face. Two supports 10 have a connection with the base-plate. A slide 13 is fitted to slide in the guideways 11 and 12 and supports a screw 14, having its lower end fitted to enter an opening 15 in the base-plate in order that the slide may be held in a certain relation respecting the base-plate. To the slide is secured a universal chuck 16, provided with the usual clamping member 17, which move radially together in order that the material to be operated upon may be readily held by the chuck. The supports 10 hold a guide 18 in a manner to permit it to be vertically adjusted and held by the screws 19. The guide has a vertical opening within which is placed a bushing 20. The base-plate is secured in connection with the table 8, and in this instance three base-plates, with the attachments, are employed, one for each drill-spindle. The base-plate and its attachments are secured to the table so that the center of the universal chuck and guide are centrally under the spindle.

The material to be operated upon is of the cylindrical variety—for instance, washers, collars, spur-gear blanks, and the like. The blank is clamped in place in the chuck, and the slide supporting the blank is placed in connection with the base-plate of spindle 1. The spindle is lowered to bring the tool 21 into working position, and the self-feed mechanism is started. When the tool has finished its work, the slide and work are transferred under the spindle 2 and the tool 22 of that spindle allowed to complete its work, when slide and work are transferred under the spindle 3 and the tool 23 of that spindle allowed to complete its work. After the work has been transferred under the spindle 2 a new slide and work are placed under the spindle 1, and so on, keeping all three tools at work. An extra slide and chuck are provided in order that the attendant may have a new piece of work always ready for the first tool.

It is evident that a facing-tool or any other tool capable of use in connection with my improvements may be employed. The bushing 20, supported by the guide 18, serves to hold the tool centrally of the chuck and can be adjusted vertically to suit the kind of tool employed and material operated upon. The bushings are removable in order that various-sized tools can be employed.

I claim as my invention—

1. In a drilling-machine, the combination with a gang of drill-spindles of a support beneath each spindle toward and from which said spindles move in operation, of a plurality of interchangeable chucks removably mounted beneath the spindles and means for locking the chucks in position centrally beneath the spindles.

2. In a drilling-machine, the combination with a gang of drill-spindles, of a slideway beneath each spindle, slides interchangeably mounted in said ways, a universal chuck carried by each slide, and means for locking the slides in place to center the work beneath the spindles.

3. In a drilling-machine, the combination with a gang of drill-spindles, of a grooved way beneath each spindle, slides interchangeably mounted in said ways, a universal chuck carried by each slide, and a locking-pin also carried by each slide and adapted to lock the latter in place to center the work held by the chuck beneath the spindles.

4. In a drilling-machine, the combination with a gang of alined drill-spindles, of a plurality of interchangeable slides one removably supported beneath each spindle, a chuck carried by each slide, and means for locking the slides in place to center the work beneath the spindles.

JOSEPH P. BARNES.

Witnesses:
A. O. BEHEL,
E. BEHEL.